United States Patent [19]

Nakamoto et al.

[11] 4,346,338
[45] Aug. 24, 1982

[54] BATTERY CHARGING CONTROL SYSTEM FOR VEHICLES

[75] Inventors: Takeshi Nakamoto, Ohbu; Katsutaro Iwaki, Chiryu; Katsuya Muto, Kariya; Katsumi Itoh, Ohbu; Yoshio Akita, Ichinomiya, all of Japan

[73] Assignee: Nippondenso Co., Ltd., Kariya, Japan

[21] Appl. No.: 191,816

[22] Filed: Sep. 26, 1980

[30] Foreign Application Priority Data

Sep. 28, 1979 [JP] Japan ................................ 54/126220

[51] Int. Cl.$^3$ .............................................. H02J 7/14
[52] U.S. Cl. ....................................... 322/28; 320/64; 322/99
[58] Field of Search ...................... 322/28, 99; 320/48, 320/64, 68

[56] References Cited

U.S. PATENT DOCUMENTS

| | | | |
|---|---|---|---|
| 3,553,563 | 1/1971 | Kawashima | 322/99 X |
| 3,942,097 | 3/1976 | Itoh et al. | 320/64 X |
| 4,143,313 | 3/1979 | Arendt | 322/28 |

*Primary Examiner*—Robert J. Hickey
*Attorney, Agent, or Firm*—Cushman, Darby & Cushman

[57] ABSTRACT

In a battery charging control system for vehicles having an energization resistor connected to the output terminal of an auxiliary rectifier for the purpose of providing a current path from a battery through a key switch, a warning lamp and the energization resistor to indicate a failure of a generator by the lamp, an energization control circuit is provided to form the current path through the energization resistor only when a voltage developed at the output terminal of the auxiliary rectifier reaches a specified voltage level thus blocking the current path during initial excitation of the field coil of the generator.

4 Claims, 6 Drawing Figures

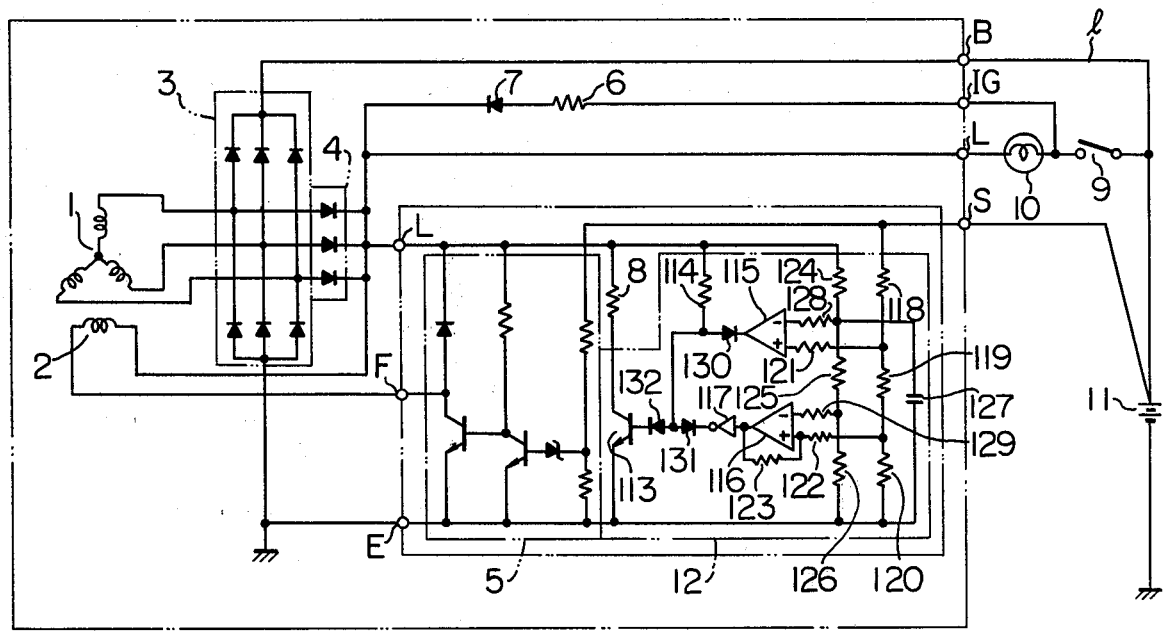

BATTERY CHARGING CONTROL SYSTEM FOR VEHICLES

BACKGROUND OF THE INVENTION

The present invention relates to battery charging control systems for vehicles which are suitable for use with generators having an auxiliary rectifier, and more particularly the invention relates to a system which is capable of alerting the driver to the occurrence of faults in the generator or the like by means of a generation indicator.

FIG. 1 shows a known battery charging control system of the above type, and connected to the output side (the "L" terminal) of an auxiliary rectifier 4 is a fault warning resistor 8 having a resistance value which is lower than those of an initial excitation resistor 6 and an indicating lamp 10. As a result, when a generation fault or the stoppage of power generation is caused due to a break failure in the excitation circuit, a current flows from a battery 11 through the lamp 10 and the resistor 8 so that the lamp 10 is turned on and the driver is alerted to the fault.

However, this construction is disadvantageous in that during the initial period of generation immediately following the closing of a key switch 9, a part of the expected initial excitation current flows to the resistor 8 instead of a field coil 2, so that the initial excitation current which must be supplied to the field coil 2 becomes insufficient somewhat, making it necessary to further decrease the resistance value of the initial excitation resistor 6 to compensate for the loss. While this has the effect of increasing the initial excitation current, it is necessary to use a resistor of a greater power capacity for the initial excitation resistor 6 with the resulting further increase in the size of the resistor 6 and the cost. It is also necessary to use a resistor of a considerably large power capacity for the warning resistor 8 itself.

SUMMARY OF THE INVENTION

With a view to overcoming the foregoing deficiencies in the prior art, it is the object of the present invention to provide an improved charging control system for vehicles, which is designed so that a fault warning resistor connected to the output of an auxiliary rectifier is not always energized and an energization circuit is established only when the generated voltage is within a predetermined range, thus decreasing the power capacity of an initial excitation resistor than previously and ensuring the flow of a sufficient initial excitation current to an excitation coil during the initial excitation period.

BRIEF DESCRIPTION OF THE DRAWINGS

FIGS. 2 to 5 are circuit diagrams showing first to fourth embodiments of the present invention.

FIG. 6 shows a plurality of waveforms which are useful for explaining the operation of the system according to the invention.

DESCRIPTION OF THE PREFERRED EMBODIMENTS

The present invention will now be described in greater detail with reference to the illustrated embodiments.

Figure 1:
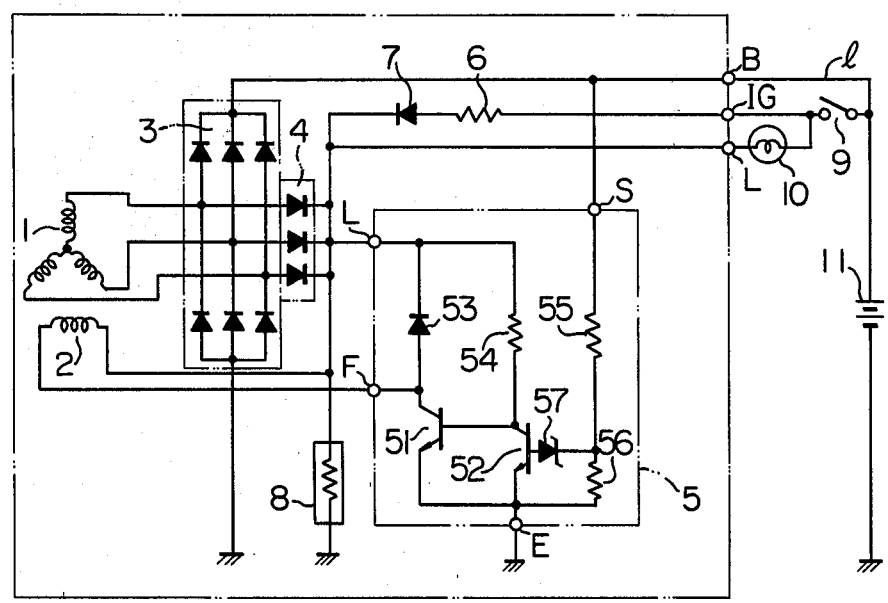
FIG. 1 is a circuit diagram showing a prior art charging control system.
Figure 2:
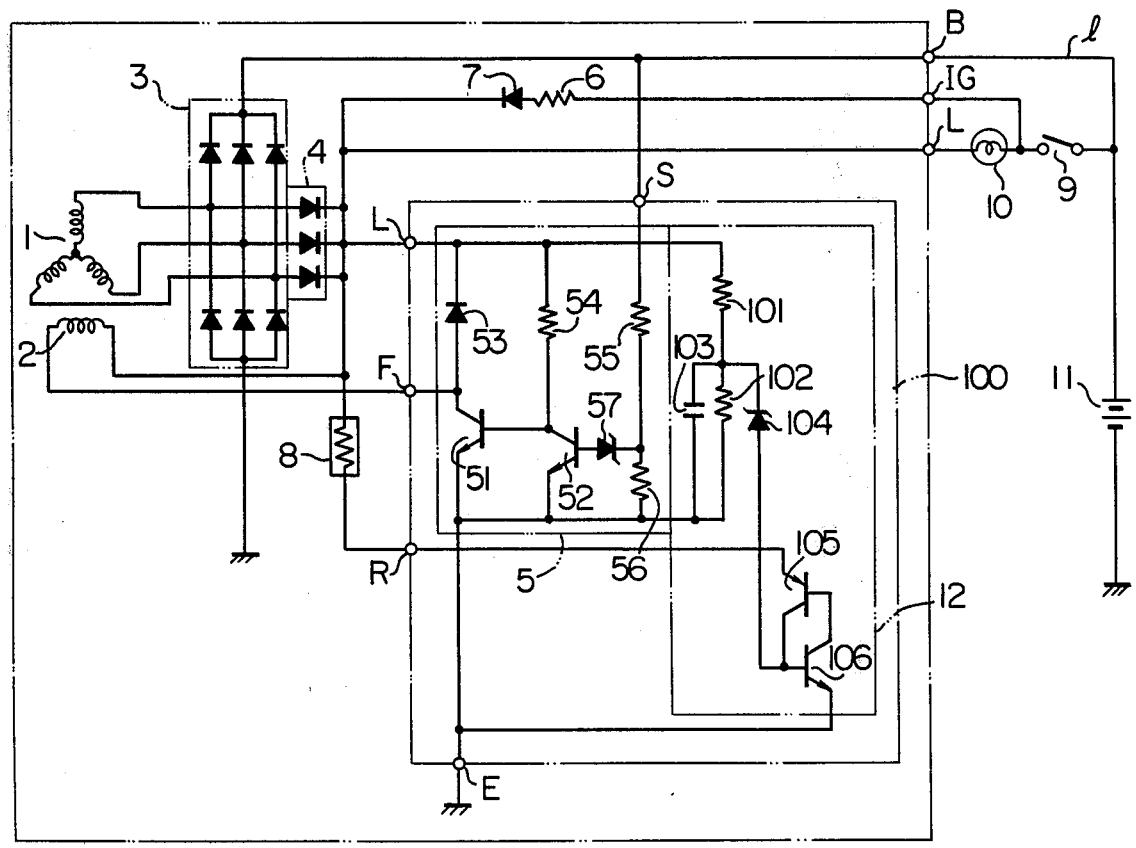

Referring first to FIG. 2 showing a first embodiment of the invention, numeral 1 designates armature coils, 2 a field coil, 3 a main rectifier for full-wave rectification purposes, and 4 an auxiliary rectifier, and these elements 1 to 4 form a three-phase AC generator unit which is driven from an engine installed in a vehicle. Designated by l is a charging line, 6 an initial excitation resistor, 7 a diode, 8 a generator fault warning resistor, 9 a key switch (usually an ignition switch), 10 a generation indicator lamp, and 11 a vehicle battery. Numeral 100 designates a generation control unit which is usually in the form of an IC or LSI comprising a voltage regulator circuit 5 and an energization control circuit 12. The voltage regulator circuit 5 detects the generated voltage and controls the energization of the generator so as to maintain the generated voltage at a fixed value, and it is comprised of an output transistor 51 and a control transistor 52 which are usually connected in a Darlington configuration, a flywheel diode 53 for absorbing the counterelectromotive force generated by the excitation coil 2, a base resistor 54, generated voltage detecting resistors 55 and 56, and a Zener diode 57. The energization control circuit 12 is designed so that the fault warning resistor 8 is energized only when the generated voltage at an "L" terminal rises to a predetermined value, and it is comprised of resistors 101 and 102 for detecting the voltage at the "L" terminal, a delay capacitor 103 for preventing any malfunctioning by smoothing and delaying a high voltage or noise voltage generated by the closing of the key switch, a Zener diode 104, and transistors 105 and 106 forming a hold circuit. In this embodiment, the initial excitation resistor 6, the fault warning resistor 8 and the generation control unit 100 are integrally mounted on the generator unit and they are provided to control the generated voltage. As a result, the output terminals interconnecting the generator unit and the battery 11 include only a "B" terminal, an "IG" terminal and the "L" terminal. Of course, an "S" terminal must be used in cases where the battery voltage is controlled.

With the construction described above, immediately following the closing of the key switch 9 the voltage at the "L" terminal momentarily becomes the battery voltage (e.g., 12 volts) and then the output transistor 51 is turned on, thus causing the voltage at the "L" terminal to drop to a considerably lower voltage (e.g., 2 to 3 volts) which is dependent on the resistance values of the initial excitation resistor 6, the lamp 10 and the excitation resistor 2. In this case, the delay capacitor 103 prevents the Zener diode 104 from being turned on by the momentarily generated battery voltage. As a result, when the key switch 9 is closed, the Zener diode 104 is not turned on so that the fault warning resistor 8 is not energized and all the initial excitation current flows through the excitation coil 2 and the output transistor 51. At this time, the lamp 10 is turned on indicating that the generator is not generating as yet.

Then, as the engine is started so that the generated voltage of the generator increases and the voltage at the "L" terminal reaches a predetermined voltage (e.g., 7 to 8 volts), the Zener diode 104 of the energization control circuit 12 is turned on and the transistors 105 and 106 are turned on. Thereafter, the transistors 105 and 106 are self-sustained in the ON state and the energization circuit through the resistor 8 is established until the key switch 9 is opened again. During this time interval a current is supplied to the "L" terminal from the auxiliary rectifier 4 and thus the flow of current to the resistor 8 does not result in any lack of excitation current.

On the other hand, the voltage regulator circuit 5 detects the generated voltage through the "S" terminal so that the transistors 51 and 52 are turned on and off in accordance with the generated voltage and the excitation current is controlled, thereby performing the voltage regulation to maintain the generated voltage at a predetermined voltage (e.g., about 14 to 15 volts). In this case, when the generated voltage which was starting to rise becomes substantially equal to the battery voltage, the lamp 10 is turned off.

On the other hand, with the generator in operation, if a break failure (e.g., a break in the excitation coil 2 or the disconnection of the "F" terminal) occurs in the excitation circuit so that the generator stops generating, no generated voltage is supplied from the auxiliary rectifier 4 and the voltage at the "L" terminal is decreased. Thus, an energization circuit is established extending from the battery 11 through the key switch 9, the lamp 10, the initial excitation resistor 6, the resistor 8 and the transistors 105 and 106 and the lamp 10 is turned on, thus alerting the driver to the fault.

In the above-mentioned break failure condition, if the key switch 9 is opened and then it is closed again, no current flows to the excitation circuit including the transistor 51 and the voltage at the "L" terminal is maintained substantially at the battery voltage (e.g., 12 volts). Thus, when this terminal voltage exceeds the Zener voltage after the delay time of the capacitor 103, the Zener diode 104 is turned on and the transistors 105 and 106 are turned on. When this occurs, in the like manner as mentioned previously, the energization circuit including the resistor 8 is established so that the lamp 10 is turned on and the driver is alerted to the fault in the generator.

It will thus be seen that during the initial excitation period immediately following the closing of the key switch, the energization circuit including the fault warning resistor 8 is interrupted, with the result that even if the initial excitation resistor 6 has a smaller power capacity and somewhat greater resistance value than previously, a sufficient initial excitation current can be supplied to the excitation coil 2, and thus even if the resistance value of the resistor 8 is selected somewhat greater than previously, the lamp 10 can be turned on when a break occurs in the excitation circuit.

Figure 3:
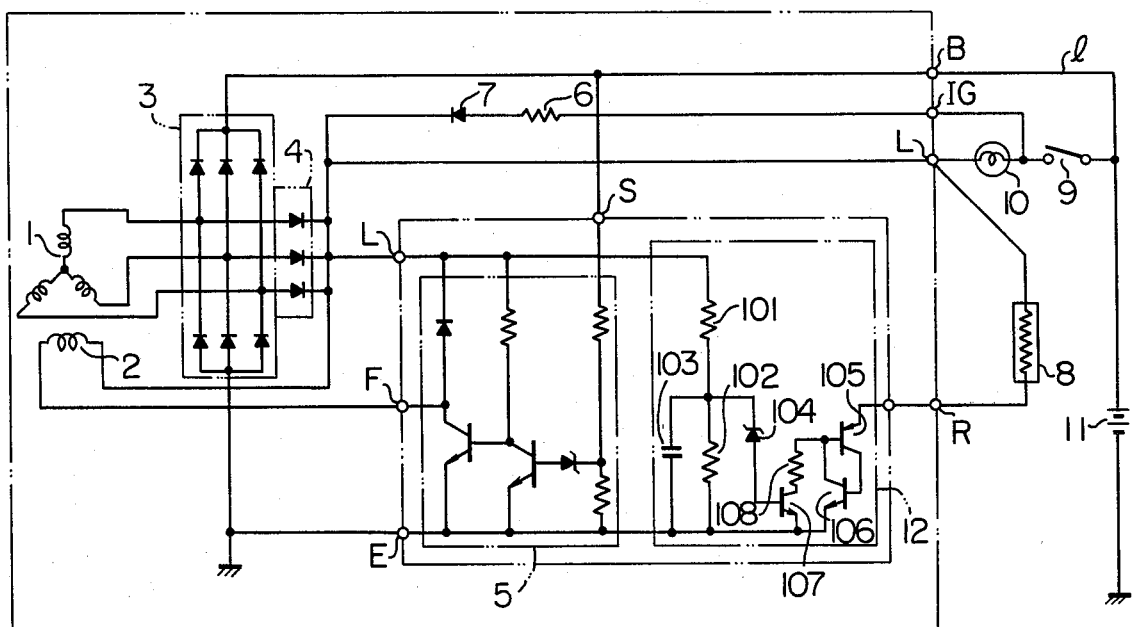

Referring now to FIG. 3, there is illustrated a second embodiment of the invention which differs from the first embodiment in that instead of directly operating the transistors 105 and 106 forming a hold circuit through the Zener diode 104 of the energization control circuit 12, a transistor 107 and a resistor 108 are additionally provided so that the transistor 107 is first operated by the Zener diode 104 and then the transistors 105 and 106 are operated by the transistor 107. In this way, the transistors 105 and 106 can be more positively prevented from malfunctioning due to any noise voltage applied through the "L" terminal.

Figure 4:
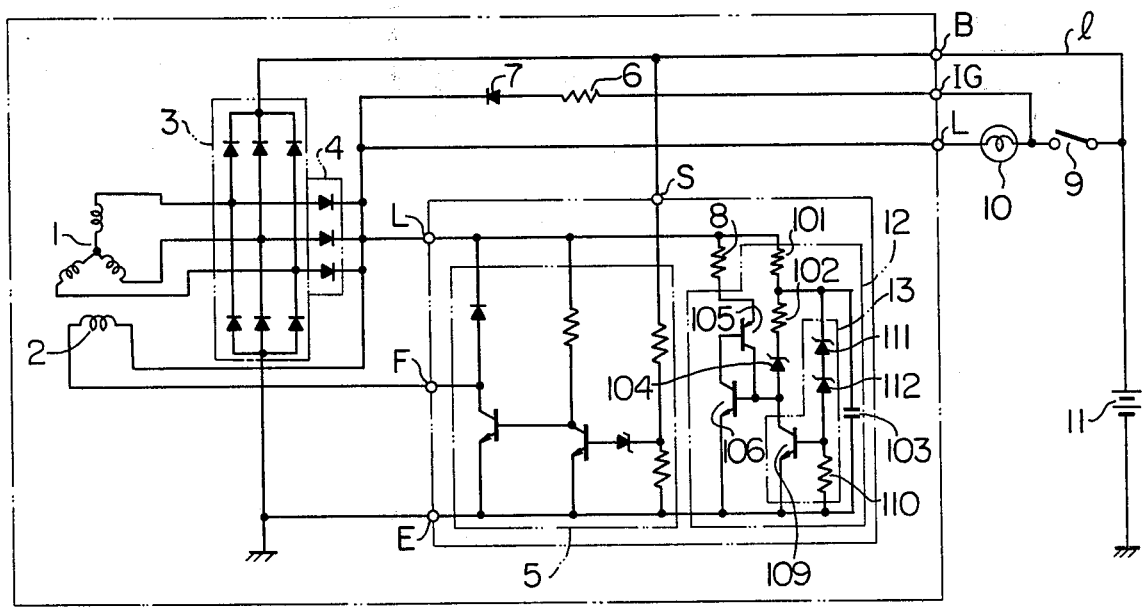

Referring now to FIG. 4, there is illustrated a third embodiment of the invention which differs from the first and second embodiments in that an energization inhibition circuit 13 is further provided in the energization control circuit 12 so that when the key switch is first closed and then the generated voltage reaches a first predetermined value (e.g., 7 to 8 volts), the Zener diode 104 is turned on and the transistors 105 and 106 are turned on, thus establishing the energization circuit through the fault warning resistor 8. When the generated voltage increases further and reaches a second predetermined value (e.g., 13 to 14 volts), Zener diodes 111 and 112 are turned on and a transistor 109 is turned on. Thus, the transistors 105 and 106 are turned off forcibly and the current supply to the energization circuit is interrupted.

As a result, the supply of current to the fault warning resistor 8 is limited only to a short period of time during which the output voltage of the generator rises to the desired value (i.e., usually less than 500 msec, though it differs depending on the engine rpm), thus reducing the power consumption of the resistor 8 as far as possible. Thus, as mentioned previously, it is possible to decrease the power capacity of the initial excitation resistor 6 and hence it is possible to satisfactorily reduce the power capacity of the fault warning resistor 8. In accordance with this embodiment, the resistor 8 is reduced to about 1 W so that instead of externally mounting the resistor 8, it is possible to integrally incorporate it in the IC circuit board.

With the above-described third embodiment, the first predetermined value is adjusted to a value which is intermediate between the voltage appearing at the "L" terminal upon occurrence of a break in the excitation circuit and the voltage appearing at the "L" terminal when the excitation circuit is not faulty and the initial excitation operation is being performed, and the second predetermined value is adjusted to a value which is intermediate between the voltage appearing at the "L" terminal upon occurrence of a break in the excitation circuit and the voltage appearing at the "L" terminal when the generator is generating normally.

Referring to FIG. 5, there is illustrated a fourth embodiment which performs the same function as the above-described third embodiment by means of a different circuit construction. In the energization control circuit 12, numeral 113 designates a transistor for operating the fault warning resistor 8, 114 a base resistor, 115 and 116 first and second comparators, 117 an inverter gate, 118, 119 and 120 resistors for dividing the battery voltage to produce comparison reference voltages, 121 and 122 input resistors, 123 a resistor for varying the comparison reference voltage to cause the output of the second comparator 116 to exhibit hysteresis, 124, 125 and 126 resistors for dividing the voltage at the "L" terminal for application, 127 a delay capacitor, 128 and 129 input resistors, and 130, 131 and 132 diodes.

With the construction described above, when the key switch is closed, the battery voltage momentarily appears at the "L" terminal and the voltage is then absorbed by the delay capacitor 127. Immediately thereafter, the excitation circuit is energized so that the "L" terminal voltage drops to about 2 volts and the first and second comparators 115 and 116 generate high level signals as shown in (A) and (B) of FIG. 6. Thus, the output of the inverter gate 117 goes to a low level as shown in (C) of FIG. 6 so that the base current of the transistor 113 is absorbed and the transistor 113 is turned off.

On the other hand, when the generator is started so that in this case the generated voltage rises to 6 volts, the output of the second comparator 116 goes to the low level so that the output of the inverter gate 117 goes to the high level and the transistor 113 is turned on. When the generated voltage reaches 14 volts, the output of the first comparator 115 goes to the low level and the transistor 113 is again turned off as shown in (D) of FIG. 6. On the contrary, if the generated voltage continues to decrease, due to the hysteresis of the second comparator 116 as shown in (B) of FIG. 6, at the moment that the generated voltage drops to 3 volts the output of the second comparator 116 goes to the high level and the transistor 113 changes from the ON to the OFF state.

It will be seen that in accordance with the present embodiment, since the generated voltage is detected by the comparators 115 and 116 so as to control the energization of the fault warning resistor 8, the generated voltage values for turning on and off the energization can be adjusted as desired within a wider range.

While, in the embodiments described above, the hold circuit comprises the transistors 105 and 106 which are connected in thyristor configurator, the circuit may be comprised of a memory circuit such as a flip-flop.

Further, while the indicator means comprises the lamp 10 which is directly connected between the key switch 9 and the "L" terminal, a relay coil may be connected in place of the lamp 10 so that the relay contacts provided in a separate path are opened and closed to turn on and off a lamp connected in the path.

Further, while the generated voltage is applied to the energization control circuit 12 from the auxiliary rectifier 4, the generated voltage may be taken from any other portion.

It will thus be seen from the foregoing description that the present invention has among its advantages the fact that since a charging control system for a vehicle generator having an auxiliary rectifier is so designed that an energization resistor connected to the output terminal of the auxiliary rectifier is not always energized but the energization path is established through the energization resistor only when the generated voltage is within a predetermined range. When there is a break failure in the excitation circuit, indicator means is operated by means of the energization resistor, and moreover during the initial excitation period with no generated voltage appearing the energization path through the energization resistor is opened, thus supplying a sufficient initial excitation current to an excitation coil and thereby making it possible to satisfactorily decrease the power capacity of an initial excitation resistor as compared with the prior art system in which the energization resistor is always energized and decreasing the resistor in size and shape with the resulting saving of mounting space.

Another advantage is that in an embodiment of this invention the voltage appearing at the output terminal of the auxiliary rectifier is detected as the generated voltage so that the energization resistor is energized when the detected voltage reaches a first predetermined value, and consequently there is no need to provide any additional terminal for voltage detecting purposes but it is possible to add a circuit having a new function through a simple operation.

Still another advantage is that in another embodiment of the invention the voltage appearing at the output terminal of the auxiliary rectifier is detected at two points or first and second predetermined values such that the energization resistor is energized only when the generated voltage is between the predetermined values, and consequently during the power generating operation including the initial excitation period the amount of wasted power consumed by the energization resistor is reduced, thus satisfactorily reducing the power capacity of the energization resistor and reducing its size and shape.

We claim:

1. A charging control system for vehicles comprising:
    an AC generator having a field coil and an armature coil installed in a vehicle;
    a main rectifier for rectifying an output of said AC generator;
    an auxiliary rectifier for rectifying an output of said AC generator;
    a battery connected to an output terminal of said main rectifier through a charging line and to an output terminal of said auxiliary rectifier through both a key switch and a parallel circuit including indicator means and an initial excitation resistor;
    a voltage regulator for energizing said field coil of said generator so as to control the generation of power by said generator;
    an energization resistor connected to the output terminal of said auxiliary rectifier; and
    an energization control circuit disposed such that an energization path is established between the output terminal of said auxiliary rectifier and a ground through said energization resistor only when the generated voltage of said generator is within a predetermined range, said energization control circuit including:
        a voltage detecting circuit for receiving a voltage generated at the output terminal of said auxiliary rectifier and for detecting that said input voltage has reached a first predetermined value;
        delay means for delaying the voltage to said voltage detecting circuit; and
        a hold circuit responsive to a detection signal from said voltage detecting circuit for performing a self-holding operation and for establishing an energization path through said energization resistor.

2. A system according to claim 1, wherein said energization control circuit further includes an energization inhibition circuit for receiving as an input the voltage generated at the output terminal of said auxiliary rectifier, whereby when said input voltage reaches a second predetermined value which is higher than said first predetermined value, the supply of current through said energization resistor is forcibly interrupted.

3. A charging control system for vehicles comprising:
    an AC generator having a field coil and an armature coil installed in a vehicle;
    a main rectifier for rectifying an output of said AC generator;
    an auxiliary rectifier for rectifying an output of said AC generator;
    a battery connected to an output terminal of said main rectifier through a charging line and to an output terminal of said auxiliary rectifier through both a key switch and a parallel circuit including indicator means and an initial excitation resistor;
    a voltage regulator for energizing said field coil of said generator so as to control the generation of power by said generator;
    an energization resistor connected to the output terminal of said auxiliary rectifier; and
    an energization control circuit disposed such than an energization path is established between the output terminal of said auxiliary rectifier and a ground through said energization resistor only when the generated voltage of said generator is within a predetermined range, said energization control circuit including, a voltage divider circuit including two resistors connected to the output terminal of said auxiliary rectifier for detecting a voltage developed at said output terminal;

a capacitor having one end connected to a junction point of said voltage divider circuit for smoothing and delaying the voltage appearing at said output terminal;

a hold circuit including first and second transistors, a base and a collector of said first transistor being connected to a collector and a base of said second transistor;

an emitter-collector circuit of said first transistor being connected to said energization resistor; and a Zener diode connected between the junction point of said voltage divider circuit and the base of said second transistor, said Zener diode being rendered conductive when the voltage developed at the junction point of said voltage divider circuit reaches a predetermined voltage level, said hold circuit being maintained in an on-state after said Zener diode becomes conductive thereby to provide a current path through said energization resistor until the key switch is turned off.

4. A charging control system for vehicles comprising:

an AC generator having a field coil and an armature coil installed in a vehicle;

a main rectifier for rectifying an output of said AC generator;

an auxiliary rectifier for rectifying an output of said AC generator;

a battery connected to an output terminal of said main rectifier through a charging line and to an output terminal of said auxiliary rectifier through both a key switch and a parallel circuit including indicator means and an initial excitation resistor;

a voltage regulator for energizing said field coil of said generator so as to control the generation of power by said generator;

an energization resistor connected to the output terminal of said auxiliary rectifier; and an energization control circuit disposed such that an energization path is established between the output terminal of said auxiliary rectifier and a ground through said energization resistor only when the generated voltage of said generator is within a predetermined range, said energization control circuit including, a hold circuit connected between said energization resistor and the ground, said hold circuit having first and second transistors connected such that a base and a collector of said first transistor are respectively connected to a collector and a base of said second transistor and an emitter of said first transistor is connected to a ground side end of said energization resistor;

a series circuit of two resistors and a first Zener diode, one end of said series circuit being connected to the output terminal of said auxiliary rectifier and the other end being connected to the base of the second transistor of said hold circuit, said first Zener diode being rendered conductive when a voltage developed at said output terminal reaches a first specific voltage level thereby to turn on said first and second transistors of said hold circuit; and an energization inhibition circuit including a second Zener diode and a resistor connected in series and connected between a junction point of the two resistors of said series circuit and the ground, said energization inhibition circuit including a third transistor having a base connected to a junction point between said second Zener diode and said resistor and having a collector-emitter circuit connected between the base of said second transistor and the ground, said second Zener diode having been rendered conductive when the voltage at said output terminal reaches a second specific voltage level thereby to turn on said third transistor and to turn off said first and second transistors to cause a current path through said energization resistor to be interrupted.

* * * * *